US012780131B2

(12) United States Patent
Lowe et al.

(10) Patent No.: US 12,780,131 B2

(45) Date of Patent: Nov. 3, 2026

(54) ELECTRIC MOBILE REFRIGERATION UNIT

(71) Applicant: SUNSWAP LTD, London (GB)

(72) Inventors: Michael Lowe, London (GB); Andrew Sucis, London (GB); Nikolai Tauber, London (GB)

(73) Assignee: Sunswap Ltd. (GB)

(*) Notice: Subject to any disclaimer, the term of this patent is extended or adjusted under 35 U.S.C. 154(b) by 454 days.

(21) Appl. No.: 17/924,756

(22) PCT Filed: May 14, 2021

(86) PCT No.: PCT/EP2021/062825

§ 371 (c)(1),
(2) Date: Nov. 11, 2022

(87) PCT Pub. No.: WO2021/244832

PCT Pub. Date: Dec. 9, 2021

(65) Prior Publication Data

US 2023/0174008 A1 Jun. 8, 2023

(30) Foreign Application Priority Data

Jun. 2, 2020 (GB) ...................................... 2008254

(51) Int. Cl.

*G06F 17/00* (2019.01)
*B60H 1/00* (2006.01)

(Continued)

(52) U.S. Cl.

CPC ......... *B60R 16/04* (2013.01); *B60H 1/00428* (2013.01); *B60H 1/00771* (2013.01); *B60H 1/3232* (2013.01)

(58) Field of Classification Search

CPC ................ B60R 16/04; B60H 1/00428; B60H 1/00771; B60H 1/3232; B60H 1/00014;

(Continued)

(56) References Cited

U.S. PATENT DOCUMENTS

| | | | | |
|---|---|---|---|---|
| 4,302,945 | A | 12/1981 | Bell | |
| 5,349,535 | A * | 9/1994 | Gupta | B60L 53/665 705/400 |

(Continued)

FOREIGN PATENT DOCUMENTS

| | | | |
|---|---|---|---|
| DE | 102013014305 | A1 | 3/2015 |
| EP | 1834818 | B1 | 9/2011 |

(Continued)

OTHER PUBLICATIONS

Electrifying the Reefer Fleet (Year: 2021).*

(Continued)

*Primary Examiner* — Ronnie M Mancho

(74) *Attorney, Agent, or Firm* — Conley Rose, P.C.

(57) ABSTRACT

Refrigeration units for cooling the interior of a trailer or vehicle, related software, systems and methods for deploying and managing such units. The refrigeration unit comprises a refrigeration system configured to mount to the trailer or vehicle. The refrigeration unit further comprises a battery rack configured to receive at least one of a plurality of rechargeable batteries so as to allow it to be swapped into and out of the rack to provide adaptive battery capacity. A power management system is configured to receive DC power from the plural batteries and deliver power to a compressor of the refrigeration system. A controller is configured to control the refrigeration system to cool the interior to a predetermined temperature.

7 Claims, 6 Drawing Sheets

(51) Int. Cl.
*B60H 1/32* (2006.01)
*B60R 16/04* (2006.01)

(58) Field of Classification Search
CPC ............. B60L 2240/34; B60L 2240/36; B60L 2240/662; B60L 1/02; B60L 2200/28; B60L 2200/36; B60L 2260/46; B60L 53/80; B60L 58/13; B60L 58/21; B60L 58/22; Y02T 10/7072; Y02T 10/70; Y02T 10/72; Y02T 10/88; Y02T 90/16; F25B 27/00; F25D 29/003; F25D 11/003; B60P 3/20
USPC ............................................................ 701/22
See application file for complete search history.

(56) References Cited

U.S. PATENT DOCUMENTS

| | | | | |
|---|---|---|---|---|
| 8,013,571 | B2 | 9/2011 | Agassi et al. | |
| 8,935,933 | B1 | 1/2015 | Koelsch | |
| 9,114,794 | B2 | 8/2015 | King et al. | |
| 9,440,525 | B1 | 9/2016 | Baty et al. | |
| 9,630,614 | B1 | 4/2017 | Hill et al. | |
| 10,377,209 | B2 | 8/2019 | Kolda et al. | |
| 10,406,931 | B2 * | 9/2019 | Nakano | B60L 58/12 |
| 10,539,340 | B2 | 1/2020 | Senf, Jr. et al. | |
| 11,132,649 | B2 * | 9/2021 | Ma | G06Q 10/1093 |
| 11,703,341 | B2 * | 7/2023 | Srnec | B60H 1/00264 701/36 |
| 11,993,131 | B2 * | 5/2024 | Lavrich | B60H 1/00985 |
| 12,017,505 | B2 * | 6/2024 | Lavrich | B60H 1/3232 |
| 12,072,193 | B2 * | 8/2024 | Schumacher | B60H 1/00428 |
| 12,097,751 | B2 * | 9/2024 | Briscoe | G07C 5/004 |
| 2009/0229288 | A1 | 9/2009 | Alston et al. | |
| 2011/0114398 | A1 | 5/2011 | Bianco | |
| 2011/0156652 | A1 | 6/2011 | Kishiyama et al. | |
| 2011/0214439 | A1 | 9/2011 | Lifson et al. | |
| 2011/0225105 | A1 | 9/2011 | Scholer et al. | |
| 2012/0277923 | A1 * | 11/2012 | Tsuchiya | B60L 53/53 700/291 |
| 2013/0145781 | A1 | 6/2013 | Liu | |
| 2014/0312841 | A1 * | 10/2014 | Baba | B60L 55/00 320/109 |
| 2015/0239365 | A1 | 8/2015 | Hyde et al. | |
| 2015/0239455 | A1 | 8/2015 | Qiu et al. | |
| 2015/0321570 | A1 | 11/2015 | Cun | |
| 2016/0117759 | A1 | 4/2016 | Penilla et al. | |
| 2017/0043671 | A1 * | 2/2017 | Campbell | G08G 1/0129 |
| 2018/0056769 | A1 | 3/2018 | Kerspe et al. | |
| 2018/0087813 | A1 | 3/2018 | Senf, Jr. | |
| 2018/0245825 | A1 | 8/2018 | Koelsch | |
| 2019/0214691 | A1 | 7/2019 | Saroka et al. | |
| 2019/0217716 | A1 | 7/2019 | Yang et al. | |
| 2019/0277647 | A1 * | 9/2019 | Adetola | B60H 1/00771 |
| 2019/0366871 | A1 * | 12/2019 | Baba | H02J 3/322 |
| 2020/0180404 | A1 | 6/2020 | Chen et al. | |
| 2020/0313249 | A1 * | 10/2020 | Zhao | H01M 10/4257 |
| 2021/0031645 | A1 * | 2/2021 | Reeves | B60L 50/64 |
| 2021/0125129 | A1 * | 4/2021 | Vega | G06Q 10/06315 |
| 2021/0357029 | A1 * | 11/2021 | Cella | G05B 19/18 |
| 2021/0365894 | A1 * | 11/2021 | Ma | G06V 20/52 |

FOREIGN PATENT DOCUMENTS

| | | | | |
|---|---|---|---|---|
| EP | 2528759 | B1 | 11/2014 | |
| EP | 3066743 | B1 | 12/2017 | |
| EP | 3536552 | A1 * | 9/2019 | B60H 1/00378 |
| EP | 3543627 | A1 | 9/2019 | |
| EP | 3647087 | A1 | 5/2020 | |
| GB | 2513944 | A | 11/2014 | |
| JP | H102650 | A | 1/1998 | |
| KR | 20140103561 | A | 8/2014 | |
| KR | 20140103562 | A | 8/2014 | |
| WO | 2008/128416 | A1 | 10/2008 | |
| WO | 2011094099 | A1 | 8/2011 | |
| WO | 2015138194 | A1 | 9/2015 | |
| WO | 2017095838 | A1 | 6/2017 | |
| WO | 2017/218910 | A2 | 12/2017 | |
| WO | 2019138261 | A1 | 7/2019 | |
| WO | 2019/243524 | A1 | 12/2019 | |
| WO | 2021127647 | A1 | 6/2021 | |

OTHER PUBLICATIONS

UKIPO Combined Search and Examination Report dated Jun. 24, 2021, for Application No. GB2106893.7.
International Search Report and Written Opinion dated Sep. 30, 2021, for Application No. PCT/EP2021/062825.
Center for Digital Built Britain: The Gemini Principles (published 2018)—Digital twins of physical assets are helping organisations to make better-informed decisions, leading to improved outcomes.
Gartner Trends: Top 10 Strategic Technology Trends for 2018 (published Oct. 3, 2017).
Jaensch et al: "Digital Twins of Manufacturing Systems as a Base for Machinen Learning" (published 2018).
McKinsey Global Institute: "Disruptive technologies: Advances that will transform life, business, and the global economy" (published May 2013).
Qingfei Min et al: "Machine Learning based Digital Twin Framework for Production Optimization in Petrochemical Industry" (published Dec. 2019), ScienceDirect, International of Information Management.
EPO Communication of a notice of opposition dated Jan. 13, 2026, for Application No. 21727346.5.
Acapo Onsagers—Opponent's submission letter dated Jul. 22, 2026 to EPO for Application No. EP4157656.

* cited by examiner

ELECTRIC MOBILE REFRIGERATION UNIT

CROSS-REFERENCE TO RELATED APPLICATIONS

The present application is a 35 U.S.C. § 371 national stage application of PCT/EP2021/062825 filed May 14, 2021, and entitled "Electric Mobile Refrigeration Unit", which claims priority to United Kingdom patent application No. GB 2008254.1 filed Jun. 2, 2020, both of which are hereby incorporated herein by reference in their entirety.

FIELD OF THE DISCLOSURE

The present disclosure relates to electric mobile refrigeration units, and related software, systems and methods for deploying and managing such units.

BACKGROUND

Mobile refrigeration units are known in various industries. For instance, Transport Refrigeration Units (TRUs) play an important role for the food distribution industry in delivering fresh, frozen, and other perishable food from field to market, typically from food processors to wholesale distribution hubs and/or refrigerated storage, and then onto retail and food service industries. These are found used with small rigid vans right through to articulated trucks pulling a refrigerated container. Often, a TRU may be used with a tractor unit pulling a semi-trailer, where the TRU is added to a specially designed and insulated trailer according to a particular customer's specifications. The TRU typically consists of four primary components for the refrigeration cycle: evaporator, compressor, condenser, and expansion valve. When the compressor is driven, these combine to chill air in the interior of the trailer to cool the contents. The capacity chosen for the refrigeration unit is highly dependent on the size of the trailer and the commodity that will be hauled. For a typical trailer, the refrigeration unit's capacity can range from less than 5 kW to more than 15 KW. A TRU's capacity is generally sized 50% larger than required to allow rapid temperature pull-down when the trailer is first loaded. Without this additional pull-down capacity, trailers would have to be precooled.

Currently most TRUs are diesel driven, particularly when used with trailers. These typically use a small diesel engine to mechanically drive a compressor and power fans required for air distribution within the trailer. The period that the unit can operate on a payload of fuel depends on a number of variables such as ambient conditions, trailer design, and load requirements. Such units are well established in the industry. Nonetheless, diesel-powered TRUs have a number of drawbacks including noise and exhaust emissions. This is a particular problem, as the engine must be designed to have the power capacity to meet the pull-down requirements, i.e. chilling the interior and the contents down to the desired set point temperature, which is more power than is typically required during normal operation on the road to maintain that temperature. It is difficult to optimise a single engine to suit all possible cooling requirements. Due to these drawbacks, these units are facing a number of operational restrictions, especially during deliveries in large cities. Regulations such as ULEZ mean fleet operators need a clean, efficient solution.

Another technology is called "direct-drive", where the diesel engine of the tractor unit is also used to power the compressor of the refrigeration unit. The tractor unit engine is typically cleaner and more efficient than the small separate diesel engines used in TRUs. A hydraulic motor or electric motor may be used to couple power from the tractor engine to the compressor.

To address the inefficiencies associated with regular diesel-driven TRUs, manufacturers have developed "hybrid" diesel-electric units and other alternative technologies that incorporate electric power. Many hybrid units supplement the primary diesel engine with additional electric motors that allow the diesel engine to be switched off when the unit is plugged into grid-based electricity (shore power). This is referred to as "standby" operation. The electric motor is typically sufficient to maintain the desired set point cooling temperature when in standby operation, but does not have sufficient capacity to pull down the temperature to the desired set point.

In some hybrid examples, the diesel engine and the electric motor are mechanically coupled to the compressor "in parallel" via a belt or clutch mechanism that can selectively engage either power source as required.

In other hybrid examples, the diesel engine is used to produce AC power via an alternator/generator which is connected "in series" with an AC motor which drives the compressor. In most units the AC motor can be connected to the electricity grid for standby operation.

In a further example, in a direct drive system, the AC motor driving the compressor can be supplied by shore power as well as by AC power generated by the tractor diesel engine. Such units, where there is no separate diesel engine and the compressor is driven only by electrical power, are sometimes called eTRUs (electric TRUs). However, nomenclature is not entirely consistent across the industry, and the term "eTRU" can also be used to refer to units where the compressor is only driven electrically, i.e. via an AC motor, via either shore power or via a diesel engine, but without any mechanical coupling of the diesel engine to the compressor, and/or where the units have sufficient power to meet pull down requirements when operating on either power source.

Some hybrid designs and eTRUs have been proposed using solar/batteries to supplement and/or supplant other power sources in powering the refrigeration unit. However, these have not been readily adopted due to problems in the time taken to charge and manage batteries. Large capacity, expensive batteries are needed to provide capacity for long journeys, even though such journeys may be infrequent, and fast, expensive chargers are needed to provide high availability of the fleet and minimise downtime between journeys.

In one example, EP2528759B1 describes a "series" hybrid TRU arrangement which additionally has solar/battery storage providing power to the compressor via an AC bus. As in known series arrangements, the diesel engine provides the main source of AC power via an alternator/generator to power the AC motor driving the compressor. In addition, a power management system also provides AC power converted from solar panels or a storage battery via an inverter, which can supplement or supplant the diesel engine power. Thus, an AC bus is created with power from either the diesel engine or the power management system. A charger is also connected to the AC bus, such that the battery can be charged from power generated by the diesel engine.

In another example, U.S. Pat. No. 9,440,525B1 describes a "parallel" hybrid TRU arrangement which additionally has solar/battery storage providing power via a DC bus. Here, the diesel engine is mechanically coupled to the compressor in the usual way for parallel designs. In addition, the solar panels and battery also provide power to the DC bus. An inverter on the bus then converts this to AC power to power the AC motor to drive the compressor. The diesel engine also powers a generator which provides DC power to a DC bus for recharging the batteries.

These prior art arrangements therefore only go a little way towards reducing carbon exhaust emissions and noise.

Various other examples of TRUs are described in U.S. Pat. No. 10,377,209B2, EP1834818B1 and U.S. Pat. No. 8,935,933B1. GB2513944A describes a tractor unit with one or more batteries that are recharged from the diesel engine of the tractor unit, via the vehicle battery pack, and can be used in cooling the trailer unit. WO2019138261 relates to charge management for a battery in a TRU. AC is generated from a diesel engine generator and supplies the compressor motor. AC also fed to battery charger, which provides two isolated DC voltages: a first to recharge a battery unit and a second to power a controller.

SUMMARY

The embodiments of the present disclosure address these and other problems in the prior art.

According to a first aspect of the present disclosure, there is provided: a refrigeration unit for cooling the interior of a trailer or vehicle, the unit comprising:

a. a refrigerating system for mounting to the trailer or vehicle, including a compressor, an evaporator, a condenser, an expansion valve, and controller, arranged such that activation of the compressor causes refrigerant to circulate and remove heat from the interior via the evaporator and emit heat to the environment via the condenser;

b. plural rechargeable batteries;

C a battery rack, arranged to receive at least one rechargeable battery so as to allow it to be swapped into and out of the rack to provide adaptive battery capacity, wherein at least one of said plural rechargeable batteries is received in the rack; and d. a power management system arranged to receive DC power from the plural batteries and deliver power to the compressor; and e. a controller arranged to control the refrigeration system to cool the interior to a predetermined temperature.

Thus, an electric powered refrigeration unit may be provided using rechargeable batteries such that it can complete a journey without external energy supply (except optionally solar), i.e. without using power from the tractor unit or diesel generators, or at least minimising such use. In embodiments with solar, excess solar may be fed back to reduce diesel consumption.

This addresses the problem of enabling the shift away from solely diesel powered TRUs whilst maintaining operational benefits. Whilst some TRUs are known in the prior art, as referenced above, that incorporate a battery to in part power the TRU, this is typically as a back up to a diesel generator and so ultimately relies predominantly on diesel. Even if the battery in such prior art units was scaled up to a large, fixed battery, this would give rise to a range of secondary issues, including:

- Higher Total Cost of Ownership (TCO) than diesel
- Redundant weight and therefore unnecessary fuel consumption for the tractor unit.
- Redundant battery capacity and therefore unnecessary high capital expenditure
- Long battery charge times
- High grid reliance
- Inability to be redeployed on different delivery cycles (because the capacity is fixed)

There may be a fixed battery or batteries, typically in the main TRU unit, and the capability to fit a series of swappable batteries in for example a skid mounted on the trailer or rigid sided vehicle to capture surplus solar energy and provide power to at least the compressor and optionally other subsystems. The swappable batteries are used to vary the on-vehicle energy capacity depending on the requirements for a particular delivery cycle. A delivery cycle (also known as a "duty cycle") describes the daily pattern of use of the refrigeration system according to the particular itinerary and application assigned to it as it makes journeys/trips delivering refrigerated goods.

There is customer value in buying a TRU with initially small capacity and having the ability to scale in the future. For instance, a logistics company delivers milk at 5 degrees C. to a supermarket on a 4 hour round trip in Scotland. This might take 3 battery modules. At a later point, they may contract to deliver ice cream in Malaga over a 12 hour round trip. This would clearly take more energy to provide the necessary refrigeration. The company can thus purchase more storage as and when needed for the fleet.

This minimises the total cost of ownership. It also means the customer is not transporting battery capacity that is not needed. The operator can optimise the site where solar is used to charge. In other schemes, redundant capacity is carried around, which impacts weight, and hence fuel consumption, and capital expenditure.

a. The battery may also power the fans or other components in the refrigeration system as well as the compressor.

The Power Management System is a collection of converter features in the overall electrical system, being provided by either one package, or as separate components. Primarily, the system converts battery power to suitable power for driving the compressor. This might involve typically inverting DC power to AC power, or converting to DC power at a suitable voltage. The system may also convert power from the solar panels for driving the compressor or charging the battery. This might involve again converting DC power to AC power and/or adjusting for the large variation in voltage level output by solar panels due to the prevailing conditions. The system may also export power to the grid from either source.

In an example of the Power management system having separate components, a power distribution unit is provided comprising a DC bus to which multiple separate power controllers are connected, which in turn perform suitable conversion of power required by the power consuming/providing devices to connect and share power via the DC bus. For instance, the batteries may connect directly to the bus without conversion, whereas a motor controller may convert and provide power to the compressor, and chargers may take solar or grid energy and convert it for charging the batteries.

In an alternative example, "hybrid solar inverter" technology known from the solar power industry may be used for the Power management System, featuring both a regular charger (which rectifies and throttles AC current to a DC battery) and enables DC current to be inverted back into AC to be sold back to the grid. The latter requires matching of the frequencies. In the PV industry the term grid-tie inverter is used to describe when an inverter matches with the grid frequency and feeds energy into the grid. Battery storage is often introduced in PV systems which adds additional converter requirements as energy can flow from and to multiple AC and DC sources and sinks. The solar panels may charge the batteries or provide AC power to the grid. In turn, the batteries (DC) may provide energy to an AC load or store energy for later usage. These converter systems are merely a collection of converter features packaged in one physical unit.

Battery Swapping is applying swapping of multiple batteries on a TRU. Redundant batteries are moved to a charging/swapping station or other TRUs in the fleet. Thus, at least some batteries are configured to be easily accessible and disconnectable by an operator. The swappable batteries may be mounted on an on-vehicle racking system which makes it easy for an operative to remove, add or swap batteries both in terms of the mechanical and electrical connections that need to be made. The batteries may be received in a slot or similar aperture in the rack and electrically plug into the electrical system via a connector. If required to be removed or added, the swappable batteries can be moved from the on-vehicle racking system to a static charging station. The batteries may be moved using a mechanism which can align with both the on-vehicle racking system and static charging station so this operation can be performed with ease by a single operative. The fixed battery or batteries in contrast may be mounted in a different part of the mobile refrigeration unit, for instance in the housing of the main unit itself, where they are less accessible to operators in normal use and may require dismantling the unit to access the batteries.

In an embodiment, at least one battery is fixed and at least one battery is swappable. The swappable battery may be pluggable electrically to a connector of the power management system.

In an embodiment, the batteries are battery packs, each comprising multiple battery cells, optionally organised in physical battery modules of plural cells in parallel and/or series. The battery packs may each have an onboard battery management system that monitors and manages the individual cells, for example to balance the battery cells. The battery packs may include one or more contactors, i.e. switches, that can be closed via a control signal to connect the positive and/or negative terminals of the battery to the system, e.g. via the DC bus which connects the batteries with the various power consuming devices (e.g. the compressor) and power producing devices (e.g. solar panels, grid connectors) in the system via (where applicable) their respective power converters. The battery management system may also have communication links, e.g. a CANbus link, by which they can coordinate activity with other devices, e.g. other battery packs, chargers, the system controller. Thus, the system controller can control when the battery packs are connected to the bus, e.g. for delivering power to power consuming devices, e.g. the compressor, and drawing power for recharging.

In an embodiment, each of the plural rechargeable batteries includes a battery management system, comprising at least one contactor by which the battery is selectively electrically connectable to a DC bus of the power management system for delivering power from the battery or drawing power for recharging the battery. The use of contactors allows fine control over battery charge/discharge and management of the different batteries in the system, which may of course vary due to the adaptive capacity of having swappable, scalable battery packs. The DC bus may be a high current busbar and part of a power distribution unit (PDU), for instance provided within the TRU main body, also containing switched/non-switched connections, and a CAN to I/O interface circuit to switch the other contactors in the DC PDU.

In an embodiment, each battery management system is configured to sense the voltage level of its battery and communicate with the battery management systems of the other batteries to manage the connection of the battery to the DC bus via its contactor such that the batteries with dissimilar voltages are not connected to the DC bus at the same time. This for instance allows the system to control which batteries are connected to the bus, and hence to each other, simultaneously, and hence manage the differing voltages in the batteries arising through having different States of Charge, by selectively connecting only individual batteries or batteries with similar voltages to avoid some batteries with higher voltages feeding current into other batteries with lower voltages. This may comprise selectively switching between batteries in turn via their contactors so a single battery supplies power to the DC bus at any time. Alternatively, the controller may selectively switch in one or more additional batteries once the voltages of one or more batteries already connected to the DC bus have equalised with the additional batteries such that the additional batteries and already connected batteries are then connected in parallel. Thus, as batteries discharge, their voltages drop and other batteries, which initially have a lower state of charge and thus lower voltage, can safely be connected to the DC bus in parallel with the existing batteries as the voltages equalise.

In an embodiment, the unit comprises at least one solar panel, and optionally plural solar panels, for mounting to the trailer or vehicle, the power management system being arranged to receive DC power from the solar panel(s) for powering the compressor. The solar panel(s) may be arranged to charge at least one battery of the refrigeration unit. Thus, the roof of the trailer or vehicle may be covered with solar panel(s) providing energy to charge the on-vehicle batteries and run the refrigeration system or feed back to the tractor unit to reduce fuel consumption, or to provide energy to the electricity grid when parked at the depot. The solar panel(s) may be connected to the DC bus, e.g. via charge controllers, to distribute power to the batteries and/or compressor and/or grid connector. The refrigeration unit may thus be a so-called “prosumer”, i.e. both a consumer (via the refrigeration system) and producer (via solar) of electrical power.

The solar panel (or each panel) may be connected to the power management system via a Maximum Power Point Tracker charge controller that may include a bock-boost converter arranged to convert DC power from the solar panel to an appropriate voltage for charging the batteries.

The unit may also have a connector for connecting to a local or national electricity grid, wherein electric power from the solar panel or battery may be selectively exported to the connected electricity grid and/or the battery may be selectively charged from the connected electricity grid-either a local grid (i.e. behind the meter at the operator’s depot) or the wider national grid. The connector may receive single phase or 3 phase power from the grid and a single directional or bi-directional charger may be provided for each phase or a 3 phase charger may be provided for charging the batteries. The batteries may be charged at a static charging station in situ in the refrigeration unit connected to the grid or via a battery swapping station where the battery is swapped out of the refrigeration unit.

The static charging station is constantly connected to the grid (AC) to charge the batteries or to release surplus energy to the grid for demand side response, grid balancing or other grid connectivity. Both the on-vehicle fixed battery and the series of swappable batteries are connected to the power management system to convert electricity supply to the refrigeration system from DC to AC.

The unit may be arranged to export energy to and/or from the tractor unit. Energy charging/export to/from tractor unit may be as beneficial as grid export/charging. Thus, for instance, excess power on the electrical system may be exported to the tractor unit, e.g. where a hybrid unit, to reduce diesel emissions, unloading the alternator, etc. Supplementary power may be imported from the tractor unit from the alternator and/or via axle re-generation (from the tractor or trailer).

The mobile refrigeration units are primarily described in relation to refrigeration units for vehicles and trailers to cool the payload, i.e. so-called “TRUs-Transport Refrigeration Units”, but other embodiments may relate to other mobile cooling/refrigeration solutions, such as air-conditioning units for transportation, etc. Trailers may include semi-trailers for tractor units, “reefer” units, refrigerated shipping containers, etc.

Compared with prior art offerings, the described embodiments achieve adequate and adaptive range, cost-competitiveness in equipment cost, zero emissions, and quieter operation.

The described embodiments have various advantages. In particular, one advantage relates to limited power grid supply when charging. A fleet of electrical TRUs may require more electrical power than the local power grid can supply. In instances where many TRUs require charging at the same time, the power grid may be unable to meet the demand. The battery swapping scheme of the described embodiments solves this problem by allowing slow charging of batteries in the charging station followed by swapping into the refrigeration unit for rapid deployment. Thus, in addition to the batteries in use in TRUs, further batteries are charging in readiness. The overall system therefore typically comprises more batteries than may be expected to be in use in TRUs at any one time.

Further advantages relate to limited charger capacity when charging. A battery charger converts an AC power input to a DC power output. The cost is highly dependent of the power rating. On-board chargers are cheaper than stationary fast-chargers but provide less power. It is not economically viable to provide a high quantity of fast chargers for a fleet, so slow on-board chargers are needed, and they can cause long charge durations.

Further advantages relate to battery cost and redundant capacity. The cost of the battery makes up a large proportion of the cost of an eTRU. In an eTRU with a fixed battery the size is determined by the worst-case scenario (long journey, high ambient temperature, etc). However, the worst-case scenario occurs infrequently, and so battery overcapacity is carried on most journeys causing the battery to be large and expensive.

The unit may be arranged to monitor its usage, and comprising communication means to stream the usage data to a remote software platform, the usage data comprising one or more of: start time of journey; duration of journey; temperature set point; weather during journey; number, times and/or duration of delivery drops; payload mass and/or type; location data; energy usage; and actual temperature profile. The data may be used to model the performance of the refrigeration unit, i.e. the energy needed to achieve the temperature profile, given the other input parameters, so that predictions of energy use for future journeys can be made by inputting the appropriate input variables for the future journey. The data can also give real time feedback to operators of the system or the driver of the vehicle, and/or directly make adjustments to the refrigeration cycle. Energy usage may be any one or more of production, consumption and/or storage of electrical energy in the unit, i.e. solar energy, battery energy flows, energy consumed by the refrigeration unit, etc. Weather conditions may include ambient temperature and/or expected solar. These can be correlated with the times of the journey to estimate the amount of solar energy that will be generated and amount of energy to maintain the set point temperature. Payload mass and/or type affects the amount of cooling required to reach the set point.

In an embodiment, the unit is arranged to receive control signals from a remote software platform for charging the batteries and/or exporting power from the batteries and/or the solar panel to the electricity grid when connected. This may be the main power grid network, or the local grid, e.g. to supply power from the solar panel(s) or batteries of one trailer to another connected to he same local grid.

The unit may include an uninterruptable power supply battery, separate from the batteries powering the refrigeration unit, to power the system controller to control charging of the fixed and swappable batteries. The purpose of this is that the operator can always communicate with the TRU remotely, and it can for instance always monitor the solar energy available and thereby collect as much energy as possible. Thus, where the trailer is idle for a period of time, the controller may still monitor and manage the process of charging the fixed and swappable batteries from available PV.

In an embodiment, the unit comprises plural compressors in parallel, the controller being arranged to cumulatively engage the compressors in pulling down the temperature of the interior to a set point such that the power required remains within the power capability of the power management system.

In another embodiment, the power management system is arranged to deliver AC power to the compressor and the unit further comprising a variable speed drive for driving the compressor, such that the frequency of the AC power is modulated to adjust the power draw and limit the power draw to below the power management systems safe limit.

In embodiments at least one battery is fixed and at least one battery is swappable. Typically, it is unnecessary for all batteries to be swappable, as the unit will always require at least one battery, which can be charged in situ via mains connection or the onboard solar panel. Other batteries may be swappable to achieve the aforementioned advantages of adaptive battery capacity and allowing slow, offline charging.

Certain embodiments take advantage of the PV power production capabilities of the PV panels, intermittent PV power production and varying energy consumption. The PV power production is usually misaligned with the charging requirements for eTRUs. Energy losses happen in instants where PV power production occurs, but the battery is full. Solar Panels provide energy which in embodiments are used to (i) charge the battery, (ii) power the refrigeration system, (iii) power other TRUs in the fleet in the depot or (v) sell energy to the national grid.

Certain embodiments may also use idle battery capacity for demand side response. In some cases, the batteries are fully charged, but are not needed for a period of time, so can participate in government demand-side-response schemes, e.g. in response to a demand side response signal from a utility company. Thus, electric power can be provided to the national grid, or charging of batteries deferred, to help the utility balance the network or provide other services.

In another aspect, the present disclosure relates to a computer program for manging power requirements of mobile refrigeration units, the refrigeration units being in use attached to a trailer or vehicle to cool an interior space thereof during a journey and being powered by, at least in part, one or more rechargeable batteries and optionally one or more solar panels, the computer program comprising processor readable instructions, which when executed by the processer cause the computer to:

a. receive at least an itinerary for a journey of the refrigeration unit and set point temperature to be achieved and maintained by the refrigeration unit for cooling the interior space for that journey;
b. model the energy requirements to achieve the set point temperature for the journey, and determine a number of batteries required and/or battery charge level for each battery to provide that energy; and
c. in accordance with the determination, to:
1) output an indication of which batteries are to be swapped into and/or out of the refrigeration unit and/or
2) output a control signal to cause the required batteries to be charged to the required level.

Using modelling and prediction of the energy requirements for a journey allows the battery capacity and initial battery charge for a mobile refrigeration unit to be adapted to the journey, such that the journey is not undertaken with unnecessary batteries or charge. This frees up capacity at the depot which can be used to defer or slow down the rate of charging, share battery charge or solar with other refrigeration units and/or export energy to the grid. The software can be used to control one or more mobile refrigeration units to charge their batteries when at the depot, or control charging of batteries that have been swapped out of a refrigeration unit and deposited in a swapping station for charging, as well as instructing an operator when to swap batteries for a journey (or possibly directly causing batteries to be swapped where this is automated).

Determining the number of batteries/charge is challenging in the context of refrigeration applications. In other known battery schemes, for instance a power tool, battery packs may be available in different capacities. Generally, battery size simply scales with time of use of the power tool. However, this is not the case with refrigeration, where multiple factors come into play, such as set point temperature, ambient temperature, length of journey, which do not have a simple linear relationship with required energy. It is therefore challenging to determine the battery capacity without overestimating for safety. The modelling carried out by the embodiments of the disclosure address this issue and prevent unused battery capacity being provisioned.

The inputs to the model on which the prediction of the energy requirements is made include one or more of the parameters: desired temperature set point; expected weather conditions during the journey; start time of journey; duration of journey; number, times and/or times duration of delivery drops; payload mass and/or type; and the determination takes into account the further input of the initial state of charge of the batteries. Typically, the software may connect to a logistics software program used by the operator to extract inputs such as the temperature set point, route of journey, drops, etc. Weather conditions include factors that influence the performance of the system in cooling the interior to the desired setpoint, such as expected hours of sunlight, which affects solar generation, and ambient temperature, which affects how much cooling is required to maintain the set point temperature. Weather conditions may be obtained from a third-party system. These can be correlated with the time and duration and route of the journey to find the conditions pertaining to a particular journey. The model finds the expected energy requirement to meet the set point temperature given the conditions and payload, and based on this energy requirement calculates the amount of additional energy needed to be stored in the batteries given the initial charge state of the batteries. This can be satisfied by swapping in additional batteries and/or charging the batteries in situ or in a swapping station.

In making the determination, the software gets details of a scheduled journey from the logistics software, and from this identifies a suitable trailer for the journey and the time it is required. By tracking movement of all units across the fleet, the software determines the current status of the units and future status of the units, both in terms of energy usage by the refrigeration units and energy generation by the solar units, as well as energy flows around the system. Solar energy may be used to charge batteries compared with charging via the grid. Considered across the fleet, the software can determine how much energy is required and when, in view of predicted profiles of energy consumption and energy generation, and determine how and when to charge batteries accordingly. If there is excess energy, energy can be exported to the national grid. Energy prices on the national grid may be taken into account in this decision. This is essentially an optimisation problem, and known approaches may be used to solve it.

In an embodiment the computer program is arranged to receive usage data from at least one refrigeration unit during a journey, the data including said one or more parameters and data indicating the actual temperature achieved by the refrigeration unit and energy consumption of the refrigeration unit, which data is used to model performance of an individual refrigeration unit. A model may be generated for each refrigeration unit, as performance may vary according to characteristics of the trailer, e.g. size of trailer, refrigeration system performance, effectiveness of insulation, etc, as well as the input parameters specific to the journey. The computer program may comprise this model, which is also known as a digital twin.

In an embodiment the computer program comprises plural digital twins modelling the energy required and the energy available across plural refrigeration units in a fleet of trailers or vehicles, the computer program being arranged to optimise the charging and swapping of batteries across the fleet.

In an embodiment, the computer program is arranged to output control signals to cause export of surplus electrical energy from a battery or solar panel to the national electricity grid, or to another battery charging on the local electricity grid. The computer program may determine energy to be surplus in accordance with the cost of mains electricity.

According to a further aspect of the disclosure, there is provided a system for charging rechargeable batteries for powering mobile refrigeration units, the refrigeration units being in use attached to a trailer or vehicle to cool an interior space thereof during a journey, the system comprising:

a. a swapping station comprising charging bays arranged to receive plural respective rechargeable batteries removed from refrigeration units for charging;
b. a mains electricity connector for receiving and optionally exporting power to the national electricity grid;
c. charging control circuitry for selectively charging connected rechargeable batteries from mains electricity;
d. a processor for executing the computer program of any of the aforementioned embodiments directed to a computer program, to determine a number of batteries and/or battery charge level for each battery to supply that energy, wherein the computer program is executed either locally or remotely to the charging system; and e. in accordance with the determination, to display to an operator which batteries are to be swapped into the refrigeration unit and/or display a schedule of when to swap the batteries and/or to activate the charging control circuitry to charge the battery level to the required level.

The system may comprise one or more connectors for connecting to a refrigeration unit, wherein at least one battery of the refrigeration unit remains in situ in the refrigeration unit when connected to the charging system for charging. Thus, the local grid may have various connectors for connecting to the refrigeration units and/or to a battery swapping station. The local grid will typically be connected to the national grid via a meter. Local metering may be provided on the refrigeration units and battery charging station to monitor energy flows in the local grid, i.e. battery charging, solar generation, energy usage by the refrigeration units, export of battery or solar power to other local units or to the national grid, etc.

The software may manage a fleet of refrigeration units, wherein batteries are swappable between different refrigeration units as well as with the battery swapping station.

In an embodiment, solar energy from one or more solar panels mounted to the trailer or vehicle is controllably used by the software to charge batteries in the refrigeration unit, charge batteries in the charging station or in other refrigeration units connected to the local electricity grid, and/or export power to the national electricity grid.

The batteries connected to the charging station may be made available for demand response services.

According to another aspect of the disclosure, there is provided a method of providing adaptive battery capacity for mobile refrigeration units, the refrigeration units being in use attached to a trailer or vehicle to cool an interior space thereof during a journey and being powered by, at least in part, one or more rechargeable batteries and optionally one or more solar panels, the method comprising:

a. receiving at least an itinerary for a journey of the refrigeration unit and set point temperature to be achieved and maintained by the refrigeration unit for cooling the interior space for that journey;

b. modelling the energy requirements to achieve and maintain the set point temperature for the journey, and determine a number of batteries required and/or battery charge level for each battery to provide that energy; and c. in accordance with the determination:

1) swapping batteries into and/or out of the refrigeration unit and/or 2) causing the required batteries to be charged to the required level.

In another aspect the disclosure relates to a mobile refrigeration unit powered by rechargeable batteries, wherein the unit has adaptive battery capacity and has no other power source, except possibly solar energy. Predictive software may be used to model the refrigeration unit and predict the amount of energy needed for a scheduled journey, and provides outputs to cause the battery capacity to be adapted to provide that amount of energy, where that amount of energy may be less than the total possible battery capacity of the unit. The battery power and/or solar power may also be used to supplant or supplement power used by the tractor unit/vehicle as well as or as an alternative to powering the refrigeration unit.

According to another aspect of the disclosure, there is provided a compressor system for a refrigeration unit, comprising:

a. plural compressors in parallel;

b. a power management system arranged to supply power to the compressor from a battery system or solar panel or the electricity grid;

c. a controller, d. wherein the controller is arranged to receive a set point temperature and to drive the compressors to pull down the temperature of the refrigeration unit to the set point and maintain the temperature at that level, wherein the controller is arranged to initially activate a subset of the compressors, and to activate at least one further compressor at a later time whilst pulling down the temperature, such that the power required by the active compressors remains below a threshold determined by capacity of the power management system.

Thus, where initially engaging all compressors would exceed the safe limit, the compressors can be engaged one by one as the refrigerant becomes less dense and the suction pressure decreases. This is particularly useful for mobile refrigeration units powered at least in part by batteries, where typically motor controllers/inverters powering the compressors have a maximum safe power output limit.

It will be appreciated that any features expressed herein as being provided "in one example" or "in an embodiment" may be provided in combination with any one or more other such features together with any one or more of the aspects of the present disclosure.

BRIEF DESCRIPTION OF THE DRAWINGS

Embodiments of the present disclosure will now be described by way of example with reference to the accompanying drawings, in which.

DETAILED DESCRIPTION

Figure 1:
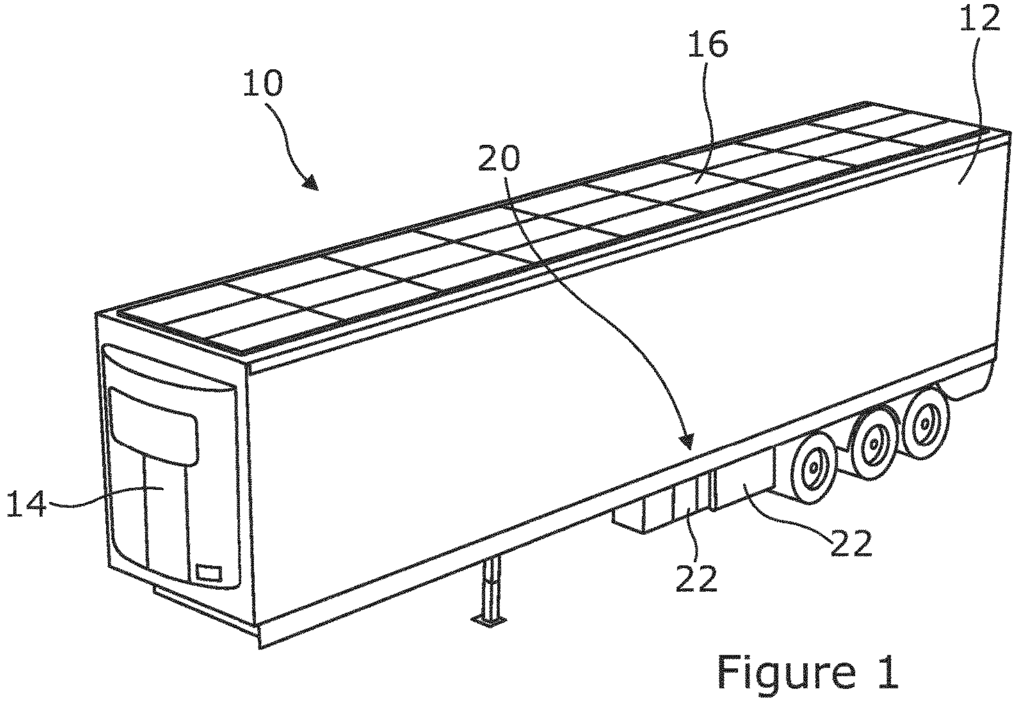
FIG. 1 shows a perspective view of an example of a TRU according to an embodiment of the present disclosure attached to a trailer.

FIG. 1 shows a perspective view of an example of a mobile refrigeration unit, more specifically in this example a Transport Refrigeration Unit 10, attached to a semi-trailer 12 of the sort that can be attached to and pulled by a tractor unit (not shown) to transport goods loaded to the interior of the trailer, where the TRU 10 implements a system for refrigerating the interior of the trailer. It will be appreciated that the TRU may equally be attached to other vehicles types, such as rigid body trucks, vans and lorries. As will be described further below, the TRU forms part of an overall system 5 for providing and managing a fleet of TRUs for respective trailers or other vehicles.

Figure 2:
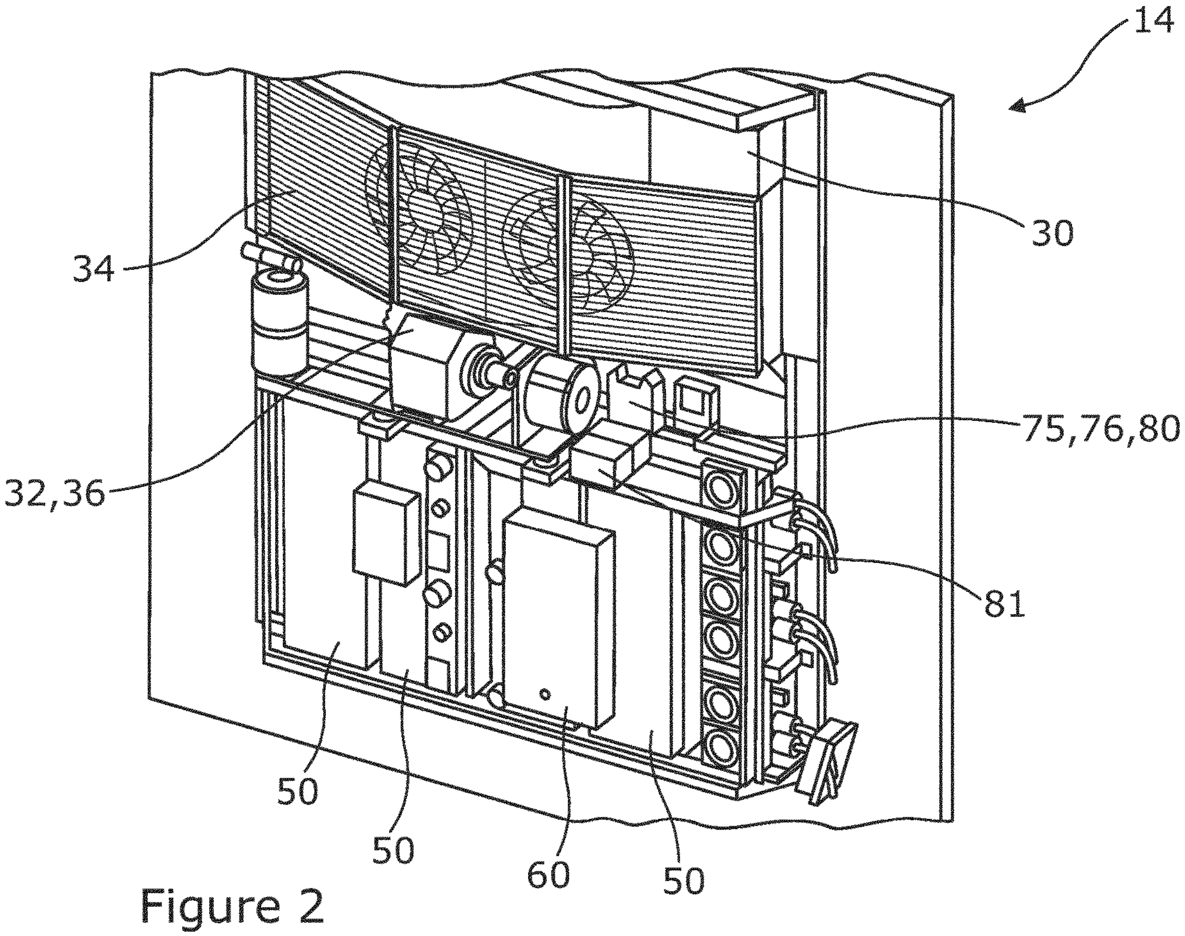
FIG. 2 shows a view of the main unit of the TRU of FIG. 1.

The TRU 10 comprises a main refrigeration unit 14, shown in more detail in FIG. 2, attached to the near end of the trailer 12 (with the doors allowing access to the interior of the trailer being at the far end), as per known arrangements. The main unit 14 comprises the four primary components for the refrigeration cycle in a vapour compression refrigeration system 29: evaporator 30, compressor 32, condenser 34, and expansion valve 36. When the compressor 32 is driven, these combine to chill air in the interior of the trailer 12 to cool the contents. The refrigeration system may alternatively be mounted in a skid on the front of the trailer, under the trailer chassis, as an over-cab mounted skid on a rigid sided vehicle, or any other mounting arrangement.

The TRU 10 also comprises one or more solar panels 16 attached to the roof of the trailer 12. The solar panels 16 may be low profile, semi-flexible, 20% efficient, polycrystalline panels for instance. These may be mounted to the roof of the trailer, but can be mounted at any convenient point. The TRU 10 also comprises a battery rack 20 which receives one or more removable batteries 22 attached to the trailer 12 in an accessible position. This may for instance be attached to one of the I-beams running the length of a standard trailer. More than one rack may be provided, e.g. on both sides of the trailer. The main unit 14 also may have one or more fixed battery 50. The fixed battery 50 and removable batteries 22, together with the solar panels 16, provide power the TRU 10. These batteries may be battery packs, each comprising multiple individual battery cells monitored and managed by a battery management system in the battery. The fixed battery or batteries are typically embedded in the TRU in a form in which they are not intended to be removed during operational life of the TRU. In other words, the TRU would need to be dismantled and/or specialist tools and expertise would be needed to access, detach, remove and replace the fixed battery. Hence, these batteries would not normally be removed (except for instance in exceptional cases where, for instance, a battery failed.) On the other hand, the swappable batteries are intended to be regularly and simply accessed, detached, removed and swapped during the life of the TRU according to the requirements of the operator, as discussed below. Thus, the TRU may be put into operation with any number of swappable batteries present in the rack, e.g. with some slots occupied and others vacant.

Figure 3:
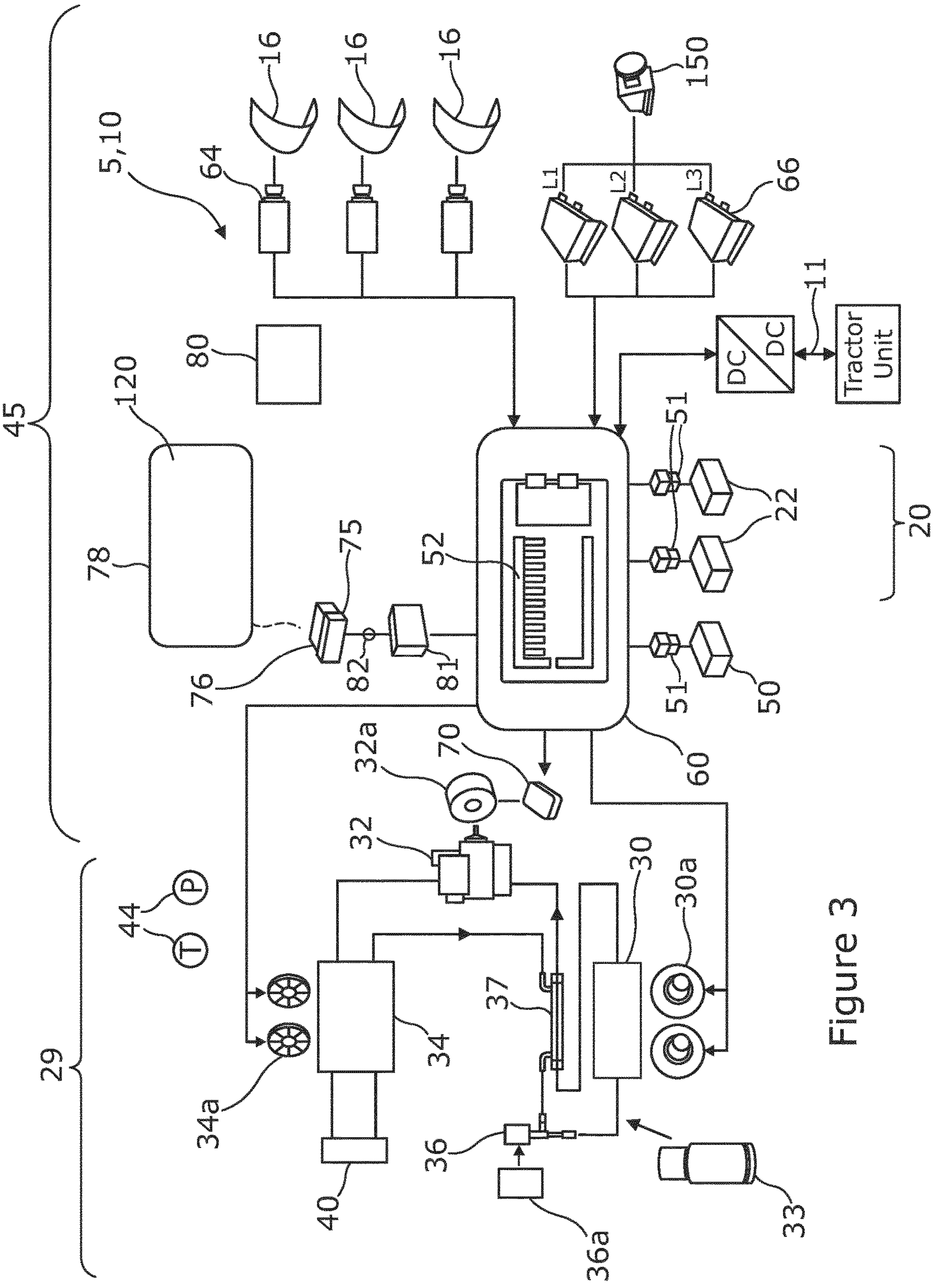
FIG. 3 shows a schematic view of the TRU of FIG. 1 part of an overall system for providing and managing a fleet of TRUS.

These and other elements of the system 5 and TRU 10 are shown in more detail in the schematic view of FIG. 3, showing in particular elements of the refrigeration system/cycle and elements of the electrical system of the TRU. This shows the aforementioned main elements of the refrigeration system 29 namely the evaporator 30, compressor 32, condenser 34 and expansion valve 36, in this example an electronic expansion valve (EEV) driven by an EEV driver 26*a*, although a thermal expansion valve may be used. The refrigerant 33, here in an example a low GWP refrigerant, enters the compressor 32 at low temperature and low pressure in a gaseous state. Here, compression takes place to raise the temperature and refrigerant pressure. The refrigerant leaves the compressor 32 and enters the condenser 34. Since this process requires work, the compressor 32 must be driven, here by an electric motor 32*a*. The compressor 32 may be scroll, screw, centrifugal or reciprocating types. In the present example, the compressor 32 is a reciprocating type driven by an internal permanent magnet AC motor.

Plural compressors may be used. These may be arranged in a modular way, which may have advantages due to the fact that the power required to power a compressor at fixed speed changes throughout a pull-down. The compressors can be configured to vary the cooling power demand of the refrigeration system. The compressor or compressors may be used with optional liquid injection or economizer if required.

The condenser 34 acts as a heat exchanger. Heat is transferred from the refrigerant to a flow of fluid-here ambient air driven across the heat exchanger surface area by fans 34*a*, and so lost to the environment.

When the refrigerant 33 enters the expansion valve 36, it expands and releases pressure. Consequently, the temperature drops. Because of these changes, the refrigerant leaves the valve as a liquid vapor mixture. The expansion valve serves to maintain a pressure differential between low- and high-pressure sides, as well as controlling the amount of liquid refrigerant entering the evaporator 30.

At the stage of entering the evaporator 30, the refrigerant is at a lower temperature than its surroundings. Therefore, it evaporates and absorbs latent heat of vaporization from the air inside the trailer 12 which is circulated by fans 30*a* to cool the contents. Heat extraction from the air to the refrigerant happens at low pressure and temperature. Compressor 32 suction effect helps maintain the low pressure.

A liquid suction heat exchanger 37 may be installed between the condenser 34 and the expansion valve before entering the evaporator 30. This helps subcooling liquid before entering the EEV and superheating the gas before entering the compressor, which provides better control of the EEV and avoids liquid droplets entering the compressor. Optionally, an accumulator (not shown) is provided upstream of the compressor 32 to prevent liquid refrigerant from flooding back to the compressor 32. A liquid receiver 40 is also provided after the condenser 34 which acts as a storage vessel designed to hold excess refrigerant not in circulation. A pressure reduction valve (not shown) coupled to the liquid receiver 40 safely relieves pressure in case of over-pressure. Various sensors 44 monitor temperature and pressure at various points in the cycle both of the refrigerant and ambient air. Further sensors may monitor the state of the various electrical elements.

The TRU 10 uses either an electric method to defrost the refrigerated compartment evaporator, or a reverse vapour compression cycle method, or a hot gas defrost method.

An electrical system 45 of power electronics is provided, the primary purpose of which is to supply electric power to drive the compressor and the fans. The fixed batteries 50 and the swappable batteries 22 are connected to a bus 52. In the present example, the bus is provided within a DC power distribution unit in the TRU main body, which may further comprise fuses, contactors, and CAN I/O module for communications with the controller. In the present example, the batteries are 48 VDC 10 kWh capacity and the TRU may have 4 fixed battery modules and the battery racking system 20 may accommodate up to 6 batteries. However, it will be appreciated that different voltages, capacities or numbers of fixed and/or swappable batteries and or their positioning may be adopted. In some examples, the batteries may be fixed or all batteries may be swappable. The number of batteries can be adjusted on a per journey basis, as energy demand can change between customers, season and application.

Within the electrical system 45, the batteries are connected via the bus 52 to various power controllers 70,64,66 to manage delivery of power from the various power sources to the batteries and from the batteries and other sources to the power consuming devices (as described further below). These power controllers are generally referred to as the power management system 60 herein. It will be appreciated that in other examples, these functions may be consolidated in a power management system, e.g. into a so-called hybrid solar inverter of the sort known from the solar industry, rather than being provided by separate power controllers/components in the electrical system 45.

Each battery pack is connected to the DC bus via a contactor 51 (or a contactor for each of the positive and negative terminal) in a Battery Management System (BMS) fitted within the battery pack. A contactor is a heavy duty version of a relay (e.g. solid state or electromagnetic) used to switch power to/from the battery packs. This is controllable to individually connect the battery to the bus for charging/discharging. The system controller might provide high-level instructions (typically from the HMI or a signal received via the cloud platform) such as start refrigeration system, or start recharging via solar, in which case the contactors via the BMS are closed to enable battery packs.

Individual control of each battery pack is also enabled via the BMS. The BMS monitors the voltage, calculates State of Charge, State of Health and many other parameters. For instance, a battery may produce a voltage range of between 46V (when entirely discharged, i.e. 0% State of Charge) and 58V (when the battery is fully charged, i.e. 100% SoC). The BMS then communicates with the BMS of the other battery packs via the CAN bus in the PDU. Depending on the voltages of the other modules, and whether their contactors are engaged, a BMS determines if it should also engage its contactor. In particular, it will be appreciated that if batteries with dissimilar voltages are connected in parallel, there is a tendency if the difference is too great for one battery to feed energy into the other battery, as current flows from high potential to low. This can shorten battery life, blow fuses and lead to other undesirable effects. The BMSs cooperate to alleviate this by avoiding connecting batteries to the DC bus with dissimilar voltages, e.g. more than 5% higher or lower than each other.

In a first example, each battery may be used in turn to provide power to the compressor to avoid the situation where battery modules of dissimilar SoC and thus voltages across their terminals will be connected together to the DC bus. For instance, the controller may select the battery module with the highest SoC to initially provide power to the compressor and other power drawing components on the DC bus, and then move to the next battery when the first battery is discharged.

In a second example, one or more batteries with a relatively high SoC are selected to initially provide power. As those batteries discharge power, their voltages drop until they reach a similar voltage to at least one other battery pack which initially had a lower SoC, at which point, that battery pack is connected to the bus via the contactor so that those battery packs provide power jointly. So for instance, a first battery may initially have a 100% SoC and a second battery has an initial charge of 50% SoC. The first battery is selected first to supply power, until its charge falls to about 50%, at which point, the second battery module can be connected to the DC bus to provide power in combination with the first battery, and so on for any other battery packs.

This second example may be generally illustrative, as it tends to distribute the load across all batteries, and thus extends their lifespan. However, there may be occasions where using some batteries in preference to others may be advantageous.

A similar technique operates when charging the battery packs via solar and/or from mains power. In other words, power to charge the batteries is selectively applied to the batteries by activating the contactors such that batteries with unequal voltages/SoC are not connected in parallel at the same time.

The trailer may have one or more solar panels to provide power when in transit and/or when stationary. Where solar power is available, this can be used to power the compressor motor (in conjunction with battery power if solar is insufficient). If there is excess solar energy, the excess can be used to charge the batteries by selectively connecting the batteries to the DC bus via the contactors. Otherwise, the batteries can be left disconnected. Often solar can only cover part of the energy required, in which case batteries or the on board chargers (OBC) 66 (if plugged in via the grid connector) will provide the remaining. If no solar or OBC is available batteries will provide the energy.

Each solar panel is connected to a MPPT (Maximum Power Point Tracker) charge controller with bock-boost converter, which in turn is connected to the battery packs via the DC bus, the efficiency of power transfer from the solar cell depends on the amount of sunlight falling on the solar panels, the temperature of the solar panel and the electrical characteristics of the load. As these conditions vary, the load characteristic that gives the highest power transfer efficiency changes. The efficiency of the system is optimized when the load characteristic changes to keep the power transfer at highest efficiency (the maximum power point). MPPT is the process of finding this point and keeping the load characteristic there. Electrical circuits can be designed to present arbitrary loads to the photovoltaic cells and then convert the voltage, current, or frequency to suit other devices or systems, and MPPT solves the problem of choosing the best load to be presented to the cells in order to get the most usable power out. The bock-boost converter then bocks or boosts the voltage level for charging the batteries. Thus, for the scenario where the panel voltage is lower than the battery voltage, it steps up the voltage to be suitable for the battery requirements so it can charge, and similarly where the voltage is too great, it steps it down.

The grid connector may be single phase, with a on-board charger (OBC) to provide power at the appropriate DC voltage level to the DC bus. Alternatively, the connector may be 3 phase and have at least one on-board charger (OBC) 66 provided for each phase or a 3 phase charger. This allows high current to be generated, as the DC bus is low voltage, to allow maximum power efficiency in charging. The charger is bi-directional, so as to be capable of the reverse process, i.e. converting PV or battery DC power to AC for sharing power with other TRUs via the local grid or exporting surplus power to the wider power grid (described in more detail below).

The power distribution unit 60 may also have contactors for selectively supplying current to the fans and other components.

The battery packs are connected to the DC bus in a post-PDU architecture, meaning that each battery pack has its own contactor(s). This electrical architecture allows integration and management of battery packs with different states of charge. It will be appreciated that this is a particular benefit in a system where multiple battery packs are detachable, swappable and scalable, and different battery packs may have very dissimilar states of charge at various points in their operation. This is a problem that does not arise in, say, EV battery management, where the battery modules in a battery packs are typically combined and hardwired together in parallel, such that the overall capacity is fixed and the battery module charge is always at a mutually similar level. While it may be known for an EV battery packs to have a contactor, this is typically used only for connecting the overall battery pack to a load (or possibly for fault isolation of battery modules in a battery pack), rather than controlling individual battery packs in a system as in the present novel architecture.

The compressor 32 in this example is powered by an AC output voltage provided by the motor controller 70 which alters the frequency of the AC power so as to vary the speed of the motor and thus the compressor under control of the system controller. The output voltage is also selectively supplied to the fans **30*a*,34*a* of the evaporator 30 and condenser 34**, e.g. via speed control on the fans via PWM.

The battery 22,50 and solar panel 16 can be used to provide power to the tractor unit itself, for example where the tractor unit runs on fuel cells or is powered by a diesel ICE. Thus, the PDU may have an output 11 to provide supplementary power to the tractor unit. This is beneficial as the solar power is cheaper than the electricity generated by a fuel cell, e.g. via a DC/DC converter. The PDU may also be able to receive supplementary power, e.g. from axle regeneration, from the tractor unit or trailer via an input for use in powering the compressor.

A system controller 75 is provided with communication links to the various parts of the TRU 10 to control and monitor the refrigeration process, i.e. to pull down and maintain a set point temperature, and to manage and monitor the various energy sources. Thus, the controller 75 communicates with the power converters 70, 64, 66 and the BMS/contactors of all the battery packs, to control the fans **301,34*a*, the compressor, the power provided by the PV panels and from the connector, the sensors 44 and voltage sensors, and any other elements of the TRU 10** in order to exchange data and send control signals.

The system controller 75 may be connected to or incorporates a wireless gateway (e.g. 4G) 76 by which it can exchange data with software 120 running on a remote server or in the cloud 78, which is part of the overall system 5. This may be an "Internet of Things" (IoT) cloud service such as for example Azure IOT Central. Thus, the controller may be a so-called IoT edge device. The controller may also be connected to or incorporate GPS for finding its location, and WiFi or Bluetooth or similar wireless signals for communicating with other external devices in the system.

A Human Machine Interface (HMI) is provided comprising a display and input means, e.g. a touch screen 80, connected with the system controller 75, e.g. by WiFi, by which an operator can locally see the status of the TRU and provide input/control.

a. Possibly inputs are one or more of:
    - setting the temperature set-point
    - setting the desired time for the TRU to be at set-point (using energy prediction). Options for this could be fastest possible or at set time in the future
    - setting the TRU on/off
b. Possibly status data are one or more of:
    - Current air temperatures inside/outside the trailer
    - Energy flows around the electrical system 45
    - Directions as to which batteries 22 to swap/add/remove
    - Whether there is sufficient charge in the batteries 22, 50 for an upcoming journey.

The system controller 75 can also be controlled directly from the cloud by the software 120, so settings can also be adjusted remotely. The system controller 75, gateway 76, and HMI 80 may be powered by an uninterruptable power supply (UPS) 81 which is a battery, separate from the fixed and swappable batteries and typically smaller. This is useful, for instance, where the trailer is parked up without any load and with partially charged batteries, the sun starts shining, and the contactors to the fixed or swappable batteries must be closed to allow charging with solar power or export to the grid. The controller is therefore "always on" and can be controlled remotely from anywhere via the cloud platform to monitor the available solar energy and if sufficient, turn on battery charging or export of energy to the grid. The UPS battery typically has sufficient capacity to power the controller for 24 to 48 hours, and is recharged automatically when there is power on the DC bus.

The system 5 uses telematics and instrumentation specific for monitoring, including but not limited to, the electrical system 45 and refrigeration system 29 performance. Air temperature inside the trailer is automatically streamed and recorded and used to warn the driver and the fleet operator if temperatures move outside the desired range. All data is stored in the cloud and is used to teach a machine learning algorithm to create a digital twin of each TRU/trailer. The digital twin is subsequently stored in the cloud and is used to provide future energy prediction for each TRU/trailer and across the fleet.

As shown by FIG. 6, the system 5 comprises a fleet of trailers 12 and TRUs 14, and optionally at least one centralised static charging location, which in this example is a battery swapping station 100, e.g. located at the depot. The system 5 may use plural batteries per TRU, the number and initial charge of which are configured by the software 120, here an IoT software platform running in the cloud 78 in conjunction with a machine learning algorithm that produces and updates digital twins. This enables the batteries 20, 50 to be small compared with prior art schemes, as the storage capacity can be adapted per journey. The software 120 manages batteries for the fleet of trailers and controls and monitors charging of the batteries at the charging location 100. In the present example, the battery swapping station is adapted to receive the removable batteries 22 when removed from the trailer for charging under the control/monitoring of the software. Alternatively or additionally, batteries 22 may be charged in situ under the control/monitoring of the software 120 by connecting the TRUs 14 to the local electricity system via their connectors 62. In this case, the removable batteries may be swapped directly between the trailers in the fleet rather than via a battery swapping station.

The static charging station is constantly connected to the grid (AC) 150 to charge the batteries via a charger, or to release surplus energy to the grid for demand side response, grid balancing or other grid connectivity. This may be a bi-directional charger (converts AC to DC one way, and inverts DC to AC the other way) as energy flows both ways. Such converters are known as "V2G" and "grid-tie" in other applications.

Figure 7:
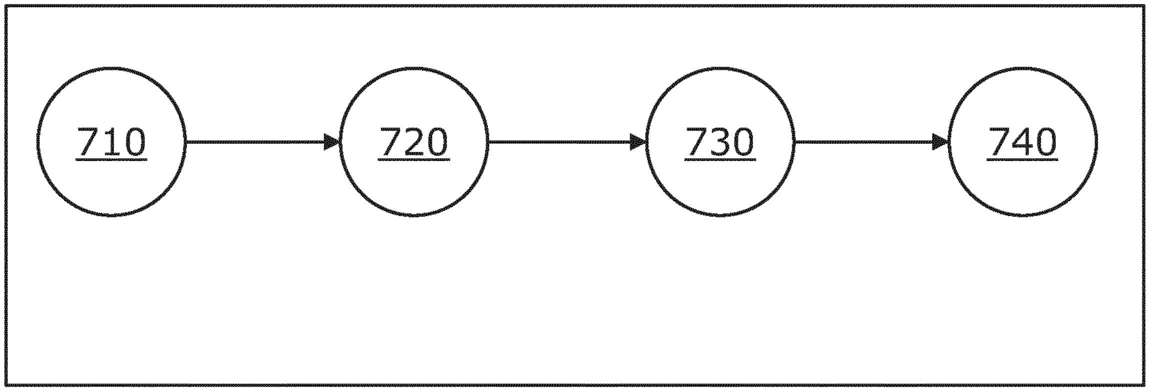
FIG. 7 shows an example of a method of using the TRU of FIG. 1.

FIG. 7 shows the main process carried out by the software. The software first predicts 710 the battery capacity for the journey. The software takes as input data representing a) the logistics schedule for the fleet, namely the desired temperature setting or profile for the goods being transported, the time and duration of the journey, the payload mass and/or type (i.e. a measure of how much is to be transported), and the number of delivery drops, b) the weather forecast and the hours of daylight of the journey, and c) the initial state of charge of the battery. Typically the itinerary for the journey is obtained from the operator's logistics software, but could be manually entered by the operator; the weather information is obtained from an online source; and the battery charge information is determined from the swapping station and or system controller 75 of the TRU 10 depending on the current location of the battery.

The software 120 then looks at the TRUs available and selects the one which best matches the requirements for the journey. The software predicts the battery capacity, i.e. energy, required to complete the journey for the best match according to the input parameters, in particular the logistics schedule and weather forecast. It will be appreciated that weather conditions and expected hours of daylight during the journey will influence how much energy is generated via solar during the journey. Ambient air temperature will affect the cooling required. The number of stops for unloading affects loss of cooling, which requires additional energy from the system to compensate for.

Once the energy required is predicted, in step 720, the software determines how many batteries are required for the journey and how much they need to be charged, taking into account the initial charge of the batteries and expected charging until the trailer must leave. Based on this, the closest match will then be charged according to the predicted energy requirement and/or the operator is instructed to swap, add or remove batteries to adapt the number of batteries if required and allow the operator to vary the on-vehicle battery capacity.

In particular, if the closest match needs another battery, the operator is instructed to add it. If the closest match has too many batteries on-board they may be removed as they can provide revenue via demand-side-response if they are left in the charging station at the depot. If there is time to charge 20 kWh but only 10 kWh is needed, the 10 kWh may be sold to the national grid or used to charge another TRU in the fleet. Effectively, this means that the TRUs need not leave the depot with redundant battery capacity. Redundant battery capacity is better left at the depot to be used by another TRU or for demand-side-response.

In step 730, the batteries removed from a TRU 10 are moved to the charging station for offline charging or to another trailer. The software controls the charging of batteries in the battery swapping/charging station and/or in situ in connected TRUs.

In step 740, the trailer and TRU embarks with its adapted battery capacity.

Figure 6A:
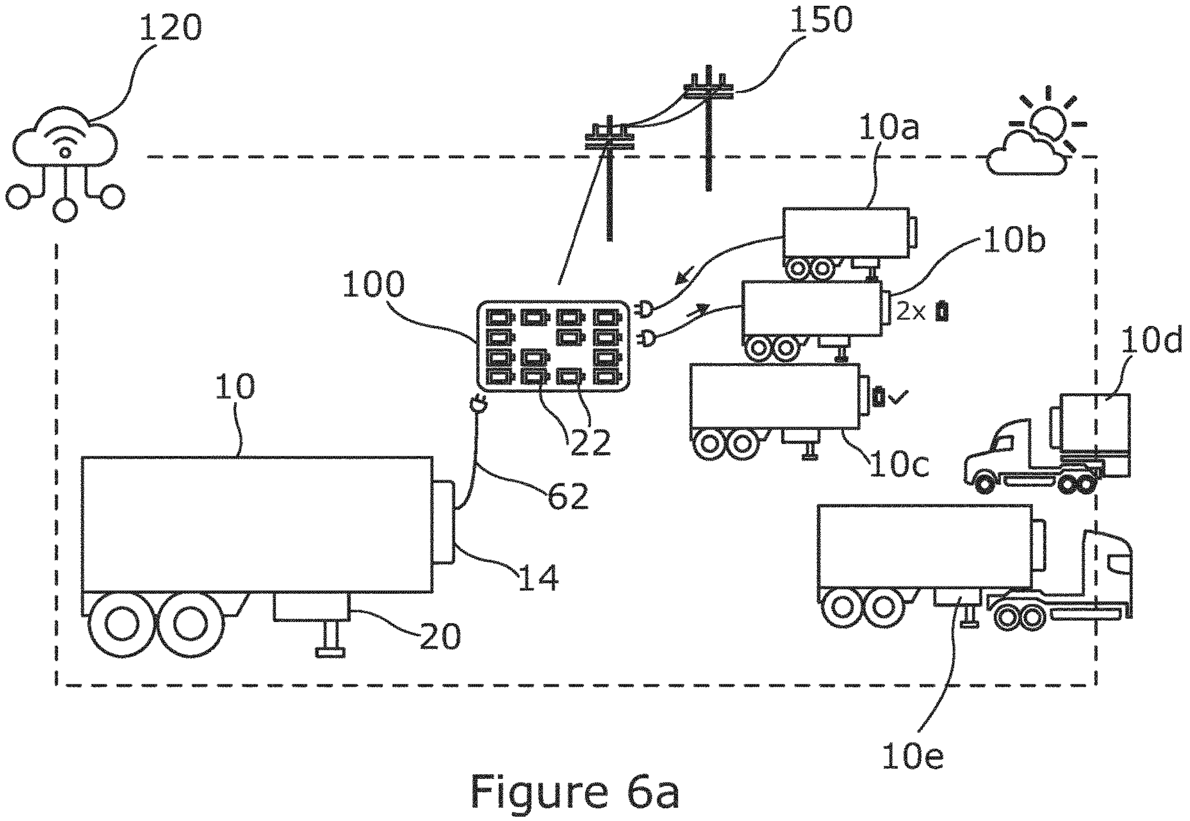
FIGS. 6*a*, 6*b* and 6*c* shows an example of a charging station as part of an overall system for providing managing a fleet of TRUs in accordance with an embodiment of the present disclosure.

FIG. 6*a* shows a fleet of trailers 12/TRUs 10 with various statuses being managed by the software platform 120. In particular, FIG. 6*a* shows a TRU 10*a* with excess energy capacity being sold to the grid, a TRU 10*b* that requires additional batteries and charging via grid 150 and/or solar to reach the predicted energy capacity, a TRU 10*c* that will depart soon which has the required number of batteries and is disconnected from the swapping station and is undergoing final solar charging, a TRU 10*d* arriving back at the depot having finished a journey, and a TRU 10*e* departing the depot on a journey. Various batteries are shown in the battery swapping station 100 charging.

Figure 6B:
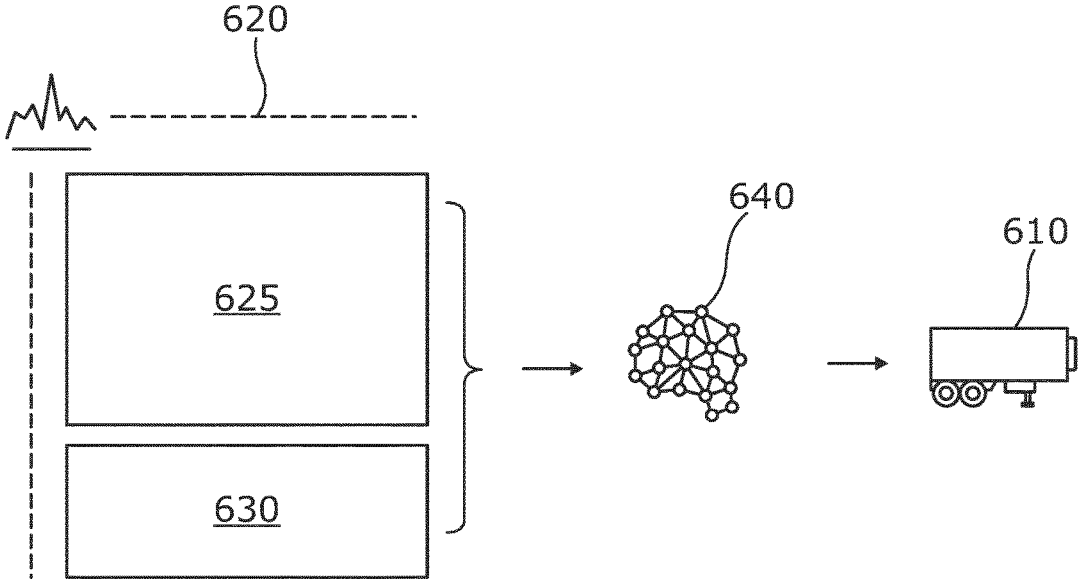

FIG. 6*b* shows a method of energy prediction in more detail. In this technique, a "digital twin" 610 is constructed to model at least one and, in some examples, each TRU 10 in the fleet. A digital twin is a digital representation that simulates virtually a real-life object, process or system. The digital twin comprises data in the form of physics-based mechanisms and models, relating to in particular the refrigerant cycle, heat loss from the trailer, etc; material properties and definitions of the system, such as characteristics of the trailer 12 and refrigeration system 29. The virtual representation of the twinned physical asset enables understanding of the behaviour of the physical object under various circumstances and in a variety of environmental conditions, so that its behaviour in the future can be predicted.

Thus, as described above, key usage metrics are continuously streamed from each TRU 10 to the cloud software 120. Data collected is linked to individual TRUs as each TRU will perform slightly differently from another. For instance, there may be different insulation thicknesses in different trailers, and/or damaged insulation on one trailer and not on another. There may be a TRU with a faulty/less efficient refrigeration cycle than another. A solar panel on one TRU may be damaged or dirty. Thus, the digital twin may be created for each TRU in the fleet, or at least different types of TRU/trailers if those in the fleet can be sub-divided into categories.

This streamed usage data creates historical data 620 of the performance of a TRU 10, i.e. the "response" of the system in terms of energy usage and temperature profile achieved, based on the "stimuli" to the system, i.e. the input data to the system as described above, i.e. the start time and duration of the trip, the desired temperature set-point, the prevailing weather conditions, the number, times, and durations of delivery drops, the payload capacity/utilisation, the location during the journey. This historical data is used to train the Digital Twin model via machine learning algorithms 640. The trained digital twin represents the digital behaviour blueprint of an individual TRU capturing the real-life response caused by indefinite combinations of stimuli at any given point in time.

Figure 6C:
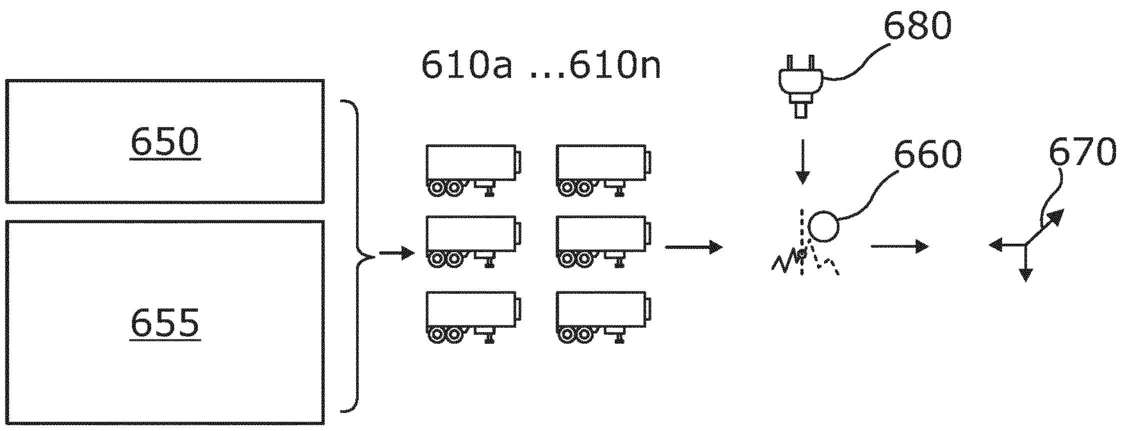

FIG. 6*c* shows in more detail the digital twin models 610 being used to predict energy usage for a TRU 10 and across the fleet 10*a* . . . 10*n*. The software 120 continuously monitors the present state 650 of the individual TRUs 10. This includes GPS location and battery state of charge. The present state provides a first input to the model 610. Future stimuli 655 are also input into the model 610, including the logistics schedule, i.e. when the TRUs must depart, number of deliveries, set-point temperature, time and duration of trip; and the weather forecast, i.e. to estimate ambient temperatures and solar energy available for the PV panels. Based on these input parameters 650,655 to the digital twin model 610 in the IoT software platform 120, the software can predict the energy required for a particular TRU to make the scheduled journey. Thus the data that is used to create the digital twin 610 using machine learning 640 which is then used to make predictions 660 for a specific TRU/journey and to manage the batteries across the fleet.

In particular, the model predicts 660 (i) how long it takes to pull down, (ii) how much energy is needed to pull down, (iii) how much energy is needed for a specific journey, which is used to generate one or more actions 670 to adjust the battery capacity and/or charging required. "Pull down" usually takes place ahead of loading goods, either starting at the depot or on the way to the first pickup. So by predicting how long it takes to pull-down the software 120 can match when the trailer 12 needs to be ready for the goods. This minimises the time when the empty trailer is cooled to the required temperature ahead of the first pickup. The temperature may be pulled down whilst connected to the grid so less battery charging/capacity is needed.

Figure 4:
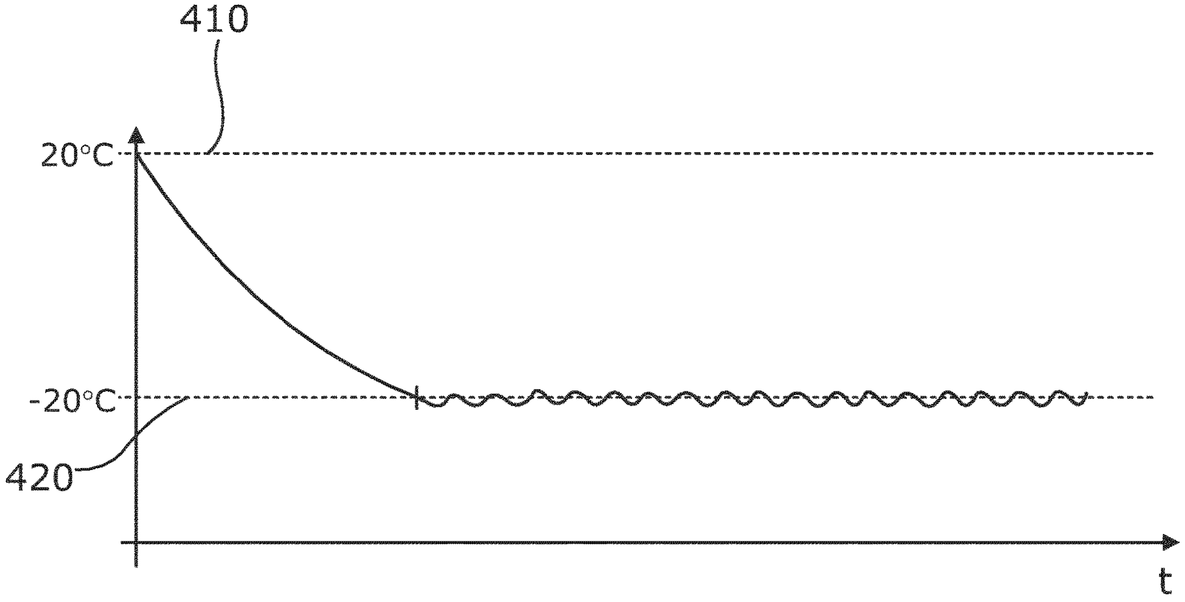
FIG. 4 shows a possible temperature profile for a TRU in operation.

FIG. 4 shows typical temperature profile over time when operating a TRU 10. Initially, the TRU "pulls down" temperature inside the trailer 12 from ambient temperature 410 to a desired set point temperature 420 as required by the goods when being transported. When the TRU 10 is started from an ambient temperature the refrigerant is dense and so the pressure of the refrigerant is high. At high pressures, compressors 32 require a lot of power, especially during start-up, due to the high inrush currents. For a typical set point of 5 degrees C. or −20 degrees C., pull down from ambient temperature, say 20 degrees C., may take 30 minutes or more. Once the set point is reached, smaller energy output is required to keep the trailer at the desired temperature, depending again on ambient temperature and effectiveness of insulation of the trailer and resultant heat ingress.

Figure 5:
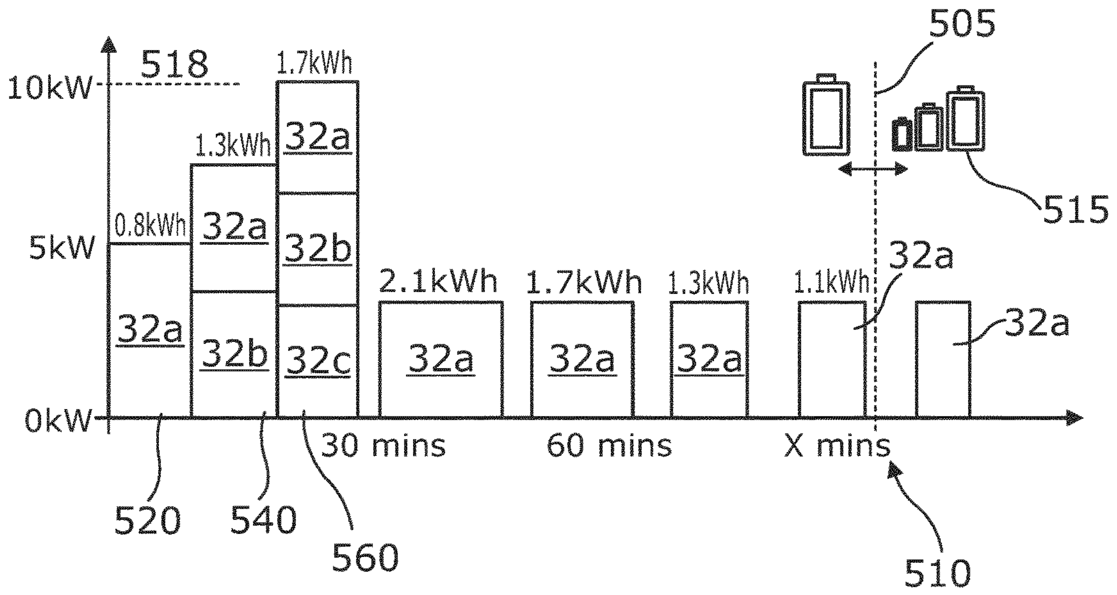
FIG. 5 shows an example of the energy prediction system used together with an example of a TRU with a modular compressor system in accordance with an embodiment of the present disclosure.

The amount of energy required over time for a particular journey, for instance shown by FIG. 5, is predicted using the energy prediction software 120 using the digital twin. It can be seen that the (in this example 10 kWh) fixed battery 505 is sufficient for pulldown and maintaining the setpoint for an initial period of time 510. The adaptive battery capacity provided by the swappable batteries 515 is selected to provide sufficient energy to fulfil the total journey requirements, i.e. to move the line 515 along the axis such that the total battery capacity is adapted to the total journey time and requirements.

Returning to FIG. 6*c*, the digital twin models 610 provide energy prediction 660 for the fleet. This comprises both what energy is available in the fleet (how much, where and when), and what energy is needed in the fleet (how much, where and when). Decisions are made by the software to balance the requirements, taking into account also the cost of electricity 680 and the potential profit from feeding energy back into the grid 150.

Finally, various actions are taken by the energy prediction software 120 based on the balancing calculation. As described, instructions can be issued to an operator to vary the number of swappable batteries 22 on the on-vehicle battery rack 20, based on expected consumption and hence the energy storage capacity. Unused batteries 22 are moved to the charging station 100 or other trailers 12 in the depot for offline charging under the control of the software so as to be ready for other upcoming journeys and/or participation in DSR services, i.e. the modification of consumer demand for energy and/or selling energy back to the national grid based on signals received from a utility company. The software controls charging and discharging of the connected batteries.

Referring again to FIG. 6*a*, the software platform 120 and charging station 100 has the capacity to manage a fleet of TRUs. This provides the ability for multiple TRUs to communicate with each other and share energy through battery swapping and vehicle to grid (V2G) technology. Vehicle-to-grid (V2G) describes a system in which plug-in electric vehicles, such as battery electric vehicles (BEV), plug-in hybrids (PHEV) or hydrogen fuel cell electric vehicles (FCEV), communicate with the power grid to sell demand response services by returning electricity to the grid. The power distribution unit 60 in each TRU and/or the power management system in the battery swapping station may be connected to the local AC grid, and thence to the grid 150, to charge the batteries or to provide V2G functionality, i.e. via an on-board or off-board bidirectional charger. A smart energy meter is mounted on the on-vehicle electrical circuit and the static charging station electrical circuit to monitor energy usage from the refrigeration system and supply energy usage information to a server.

Plural TRUs may be connected together to become a "micro grid" and may be controlled through the software platform that uses energy prediction to instruct TRUs to either share energy (from solar or their batteries) with other TRUs (directly and/or via the battery swapping station), or charge their own battery depending on (i) photovoltaic power production (ii) grid electricity cost (iii) grid capacity, (v) demand from other TRUs or (vi) logistics schedule.

Returning to the example architecture of FIG. 3, whilst a single compressor is used in this example, other arrangements are possible. As mentioned above, the compressors have a high power requirement during the initial pulldown phase. In embodiments where an inverter/motor controller is used to power the compressor motor, ordinarily, very large and expensive inverters would be needed to allow for sufficient peak power capacity to drive the compressors at start-up, as smaller units would be prone to failure. Various measures may be taken to mitigate this problem and avoid the need for large expensive inverters.

In a further example, a variable speed drive 70 is used under the control of the system controller 75 to modify the frequency of the AC power supplied from the inverter part of the power management system from the battery system 22,50 and/or solar panel system 16 to the AC motor of the compressor 32 at start up so that the power applied by the motor gradually ramps up during start up, keeping the power requirement within the safe capabilities of the motor controller. In this example, the compressor is a reciprocating type.

Figure 8:
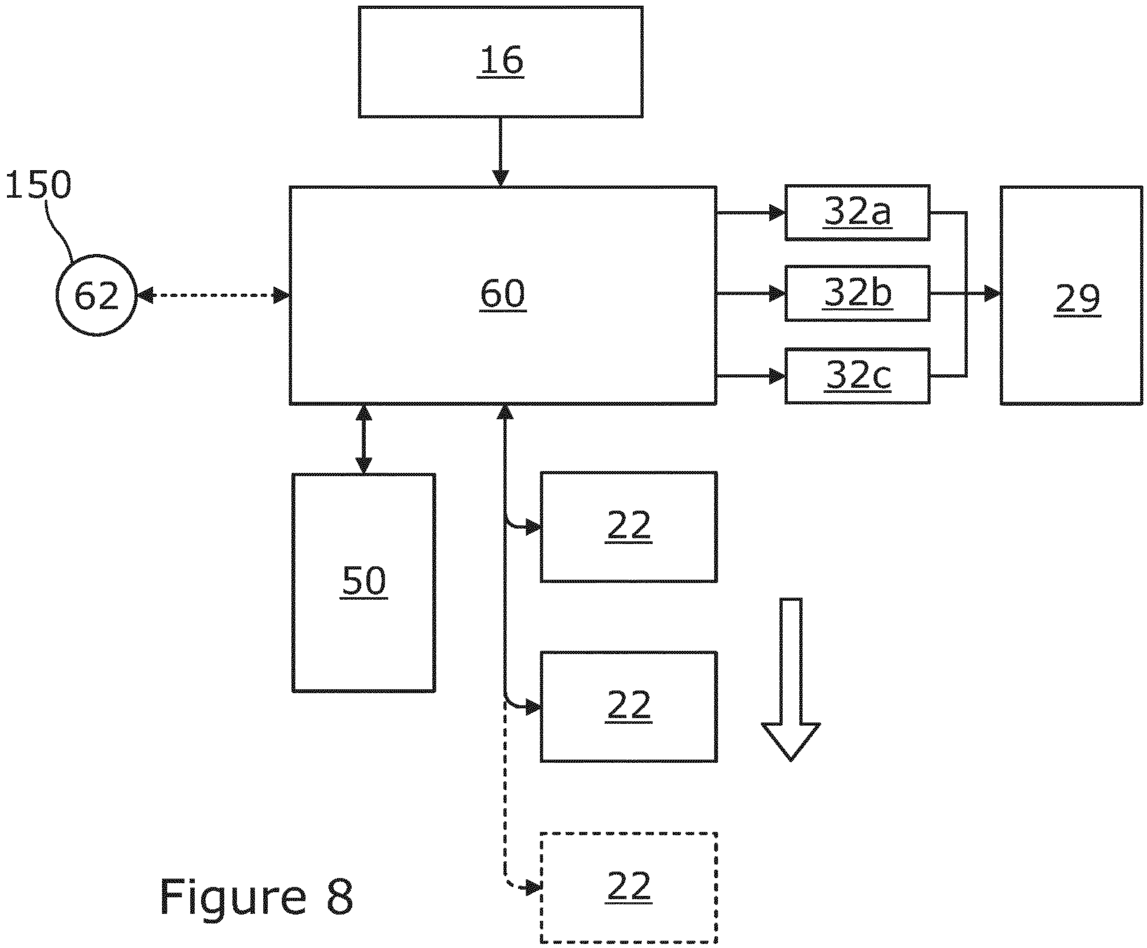
FIG. 8 shows a schematic view of a further example of a TRU according to an embodiment of the disclosure.

In another example, as shown by FIG. 8, there is an initial single compressor 32*a* and one or more additional compressors 32*b*,32*c* may be added in parallel to the initial compressor. In this example, the compressor is a scroll type. The controller 75 (not specifically shown in FIG. 8) is arranged to turn on one compressor 32*a*, and once the suction pressure as measured by a sensor 44 has dropped sufficiently, the next compressor 32*b* can be engaged, once the suction pressure has dropped further, the next compressor 32*c* can be engaged, and so on.

Thus, in the example in FIG. 5, the electrical system 60 may be designed for a capacity of 10 KW 518 with perhaps a maximum peak capacity of 12 KW for short bursts. A first compressor is engaged at start up for approx. 10 minutes 520 requiring 5 KW from the inverter consuming 0.8 kWh, staying well within the inverter capacity. After approx. 10 minutes, with the refrigerant now less dense and the compressor requiring less power, a second compressor 32*b* is engaged. The combined compressors operate for 10 minutes 540 requiring 7.5 kW from the inverter consuming 1.3 kWh, staying within the inverter capacity. After another approx. 10 minutes, with the refrigerant less dense again, a third compressor 32*c* is engaged. The combined compressors 32*a,b,c* operate for approx. 10 minutes 560 requiring approx. 10 KW from the inverter consuming 1.7 kWh, staying at or around the inverter capacity.

Once the set point is reached, compressors can be disengaged and a single compressor 32*a* is operated for periods of time to maintain the set point temperature. Thus, the system of plural compressors reduces inrush start-up current and provides capacity modulation.

Embodiments of the present disclosure have been described with particular reference to the examples illustrated. However, it will be appreciated that variations and modifications may be made to the examples described within the scope of the present claims.

The invention claimed is:

1. A computer-implemented method for managing power requirements of mobile refrigeration units, the refrigeration units configured to attach to a trailer or vehicle to cool an interior space thereof during a journey and being powered by, at least in part, one or more rechargeable batteries and optionally one or more solar panels, the method comprising:

receiving an itinerary for a journey of the refrigeration unit and a set point temperature to be achieved and maintained by the refrigeration unit for cooling the interior space for that journey;

modeling energy requirements, using a model, to achieve the set point temperature for the journey, and determining a number of rechargeable batteries required and/or a battery charge level for each rechargeable battery to provide the modeled energy requirements, wherein a digital twin, trained from historical refrigeration unit performance data via machine learning algorithms, is used for modeling performance of an individual refrigeration unit; and in accordance with the determination:

1) Outputting an indication of which rechargeable batteries are to be swapped into and/or out of the refrigeration unit; and/or 2) Outputting a control signal to cause the required rechargeable batteries to be charged to the required battery charge level.

2. The computer-implemented method of claim 1, wherein inputs to the model for the energy requirements include one or more parameters selected from a group consisting of:

desired temperature set point;

expected weather conditions during the journey;

start time of journey;

duration of journey;

number, times and/or duration of delivery drops; and payload mass and/or type, wherein the determination takes into account a further input of an initial state of charge of the rechargeable batteries.

3. The computer-implemented method of claim 2, further comprising receiving usage data from at least one refrigeration unit during a journey, the usage data including said one or more parameters and data indicating the actual temperature achieved by the refrigeration unit and energy consumption of the refrigeration unit, which data is used to model performance of an individual refrigeration unit.

4. The computer-implemented method of claim 3, further comprising using plural digital twins for modeling the energy required and the energy available across plural refrigeration units in a fleet of trailers or vehicles, and optimizing the charging and swapping of batteries across the fleet.

5. The computer-implemented method of claim 4, further comprising outputting control signals to cause export of surplus electrical energy from a battery or solar panel to a national electricity grid, or to another battery charging on a local electricity grid.

6. A software platform, comprising:

one or more processors; and a memory coupled to the one or more processors, wherein the memory is configured to store instructions that, when executed by one or more processors, cause the one or more processors to be configured to perform the computer-implemented method of claim 1, wherein the software platform is remote from the refrigeration unit, and is configured to send control signals over a network to the refrigeration unit and/or receive usage data over a network from the refrigeration unit during a journey for training the digital twin.

7. The computer-implemented method of claim 1, wherein the historical refrigeration unit performance data comprises energy usage and temperature profile achieved based on input data including start time and duration of trip, desired temperature set-point, prevailing weather conditions, number, times, and durations of delivery drops, payload capacity/utilization, and location during the journey.

* * * * *